(12) United States Patent
Lindblom et al.

(10) Patent No.: US 8,279,968 B2
(45) Date of Patent: Oct. 2, 2012

(54) METHOD OF TRANSMITTING DATA IN A COMMUNICATION SYSTEM

(75) Inventors: Jonas Lindblom, Solna (SE); Renat Vafin, Tallinn (EE)

(73) Assignee: Skype, Dublin (IE)

( * ) Notice: Subject to any disclaimer, the term of this patent is extended or adjusted under 35 U.S.C. 154(b) by 1312 days.

(21) Appl. No.: 12/006,094

(22) Filed: Dec. 28, 2007

(65) Prior Publication Data

US 2008/0232508 A1    Sep. 25, 2008

(30) Foreign Application Priority Data

Mar. 20, 2007  (GB) .................................. 0705328.3

(51) Int. Cl.
H04L 27/00  (2006.01)
(52) U.S. Cl. .................... 375/295; 375/146; 375/132
(58) Field of Classification Search .................. 375/295, 375/132, 146; 704/201, 500, 501, 228, 230; 381/22, 23, 17, 18, 19, 46; 395/2.35, 2.71; 700/94
See application file for complete search history.

(56) References Cited

U.S. PATENT DOCUMENTS

| | | | | |
|---|---|---|---|---|
| 4,752,956 A * | 6/1988 | Sluijter | ........................ | 704/219 |
| 5,353,408 A * | 10/1994 | Kato et al. | ..................... | 704/226 |
| 6,289,313 B1 * | 9/2001 | Heinonen et al. | ............. | 704/270 |
| 6,546,515 B1 * | 4/2003 | Vary et al. | ..................... | 714/746 |
| 6,757,654 B1 * | 6/2004 | Westerlund et al. | .......... | 704/262 |
| 7,394,903 B2 * | 7/2008 | Herre et al. | ...................... | 381/23 |
| 7,720,676 B2 * | 5/2010 | Philippe et al. | ............... | 704/201 |
| 2004/0131015 A1 * | 7/2004 | Sung et al. | ..................... | 370/230 |
| 2005/0053242 A1 * | 3/2005 | Henn et al. | ....................... | 381/22 |
| 2006/0190247 A1 * | 8/2006 | Lindblom | ..................... | 704/230 |
| 2006/0217975 A1 * | 9/2006 | Sung et al. | ..................... | 704/228 |
| 2008/0027711 A1 * | 1/2008 | Rajendran et al. | ............. | 704/201 |
| 2009/0234645 A1 * | 9/2009 | Bruhn | ........................... | 704/205 |

FOREIGN PATENT DOCUMENTS

| | | |
|---|---|---|
| CN | 101636950 | 1/2010 |
| EP | 1 489 599 A1 | 12/2004 |
| WO | WO 2004/040830 A1 | 5/2004 |
| WO | WO 2005/009019 A2 | 1/2005 |
| WO | WO 2005/043882 A2 | 5/2005 |
| WO | WO 2007/035147 A1 | 3/2007 |
| WO | WO-2008114090 | 9/2008 |

OTHER PUBLICATIONS

International Search Report of related application, Application No. PCT/IB2007/004558, date of mailing Mar. 13, 2009.
"International Written Opinion", International Application No. PCT/IB2007/004558, (Sep. 20, 2009), 11 pages.

* cited by examiner

*Primary Examiner* — Shuwang Liu
*Assistant Examiner* — Helene Tayong
(74) *Attorney, Agent, or Firm* — Wolfe-SMBC (57) ABSTRACT

A method of encoding a signal to be transmitted from a terminal via a channel in a communication network includes receiving the signal at the terminal; determining characteristics of the channel; encoding a first portion of the signal in accordance with a first encoding method to produce a first encoded signal portion; and encoding a second portion of the signal in accordance with a second encoding method to produce a second encoded signal portion. The first portion of the signal encoded in accordance with the first encoding method is dependent on the determined characteristics of the channel. The first encoded signal portion and the second encoded signal portion are transmitted via the channel.

25 Claims, 4 Drawing Sheets

METHOD OF TRANSMITTING DATA IN A COMMUNICATION SYSTEM

RELATED APPLICATION

This application claims priority under 35 U.S.C. §119 or 365 to Great Britain, Application No. 0705328.3, filed Mar. 20, 2007. The entire teachings of the above application are incorporated herein by reference.

TECHNICAL FIELD

The present invention relates to communication systems. More particularly the present invention relates to a method and apparatus for encoding, transmitting and receiving data in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals. Analogue information such as speech is input into an analogue to digital converter at the transmitter of one terminal and converted into a digital signal. The digital signal is then encoded and placed in data packets for transmission over a channel to the receiver of another terminal.

Each data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as voice frames, wherein each frame represents a portion of the analogue signal.

Degradations in the channel on which the information is sent will affect the information received at the receiver. Degradations in the channel can cause changes in the packet sequence, delay the arrival of some packets at the receiver and cause the loss of other packets. The degradations may be caused by channel imperfections, noise and overload in the channel. This ultimately results in a reduction of the quality of the signal output by the receiving terminal.

One type of communication network suitable for transmitting digital information is the internet. Protocols which are used to carry voice signals over an Internet Protocol network are commonly referred to as Voice over IP (VoIP). VoIP is the routing of voice conversations over the Internet or through any other IP-based network.

Channels which route information via the internet are particularly susceptible to degradation. Known methods for overcoming channel degradation employ the use of encoding schemes that generate signals that are particularly robust to degradations in the channel. However encoding a signal using such encoding schemes will remove some of the information from the signal. As such the quality of the received signal is reduced.

It is therefore an aim of the present invention to improve the perceived quality of the received signal. It is a further aim of the present invention to provide a method of improving the quality of the received signal without the use of complex computational methods.

SUMMARY

According to a first aspect of the present invention there is provided a method of encoding a signal to be transmitted from a terminal via a channel in a communication network comprising; receiving the signal at the terminal; determining characteristics of the channel; encoding a first portion of the signal in accordance with a first encoding method to produce a first encoded signal portion; encoding a second portion of the signal in accordance with a second encoding method to produce a second encoded signal portion; wherein the first portion of the signal encoded in accordance with the first encoding method is dependent on the determined characteristics of the channel; and transmitting the first encoded signal portion and the second encoded signal portion via the channel.

According to a second aspect of the present invention there is provided a device arranged to encode a signal to be transmitted from a terminal via a channel in a communication network comprising; a receiver arranged to receive the signal at the terminal; a determiner arranged to determine characteristics of the channel; a first encoder arranged to encode a first portion of the signal in accordance with a first encoding method to produce a first encoded signal portion; wherein the first portion is dependent on the determined characteristics of the channel; a second encoder arranged to encode a second portion of the signal in accordance with a second encoding method to produce a second encoded signal portion; and a transmitter arranged to transmit the first encoded signal portion and the second encoded signal portion via the channel.

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
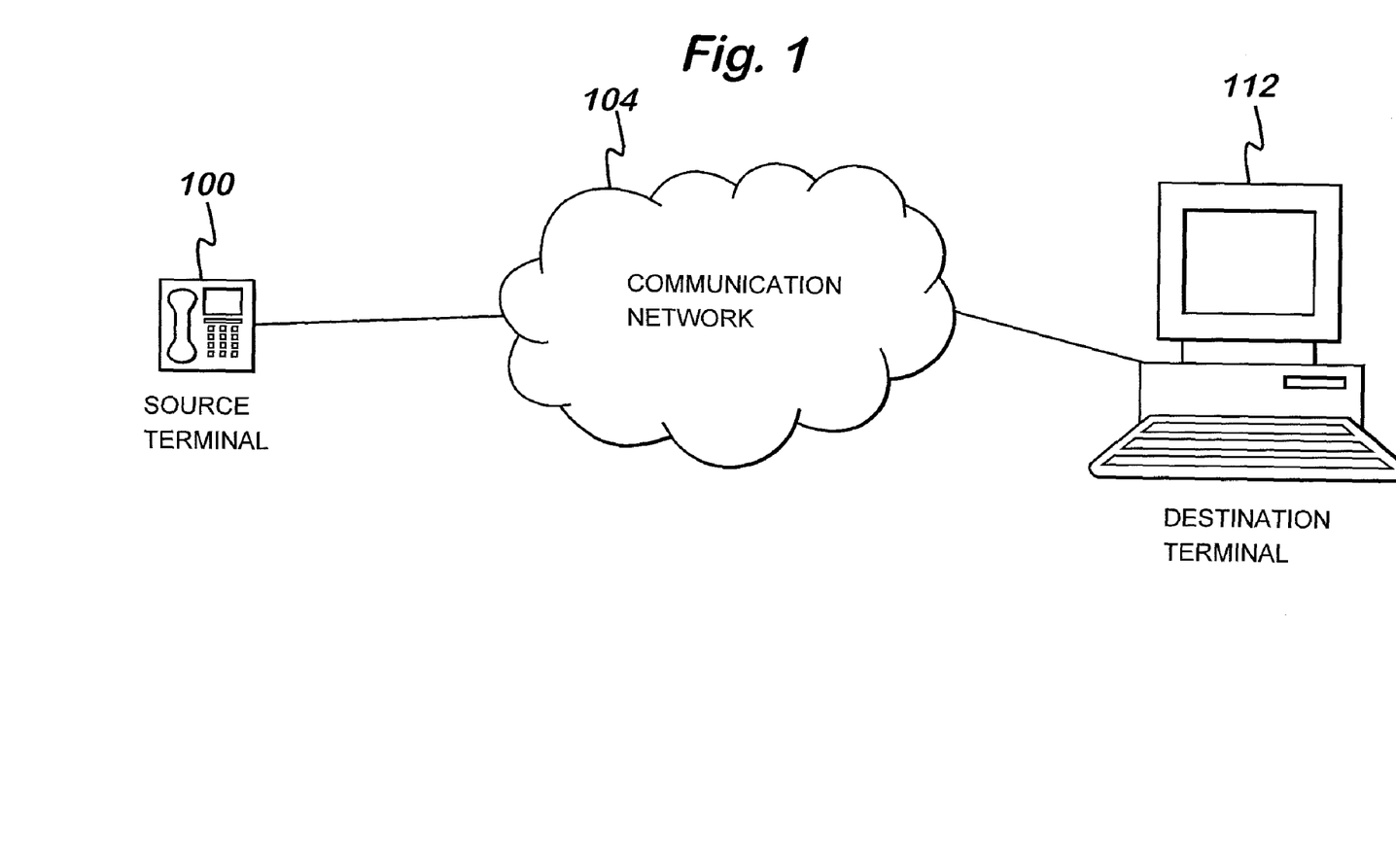
FIG. 1 is a diagram of a communication system.

Reference will first be made to FIG. 1, which shows a source terminal 100 and a destination terminal 112 connected to a communication network 104. The source terminal is arranged to transmit data to the destination terminal 112 via the communication network 104. In one embodiment of the invention the communications network is a VoIP network provided by the internet. It should be appreciated that even though the exemplifying communications system shown and described in more detail herein uses the terminology of a VoIP network, embodiments of the present invention can be used in any other suitable communication system that facilitates the transfer of data.

The terminals 100 and 112 may be, for example, a personal computer, a gaming device, a personal digital assistant, a suitably enabled mobile phone, a television or other device able to connect to the network 104.

In order to overcome channel degradations in the network 104, it is known to use parametric encoders which encode the parameters of a signal and transmit the parameters of the signal via the network. The parameters are reconstructed at a decoder of the destination terminal according to a model. Parametric model based encoding methods are particularly robust to degradations in the channel since a lost packet containing parameter information is relatively easily replaced.

Figure 2:
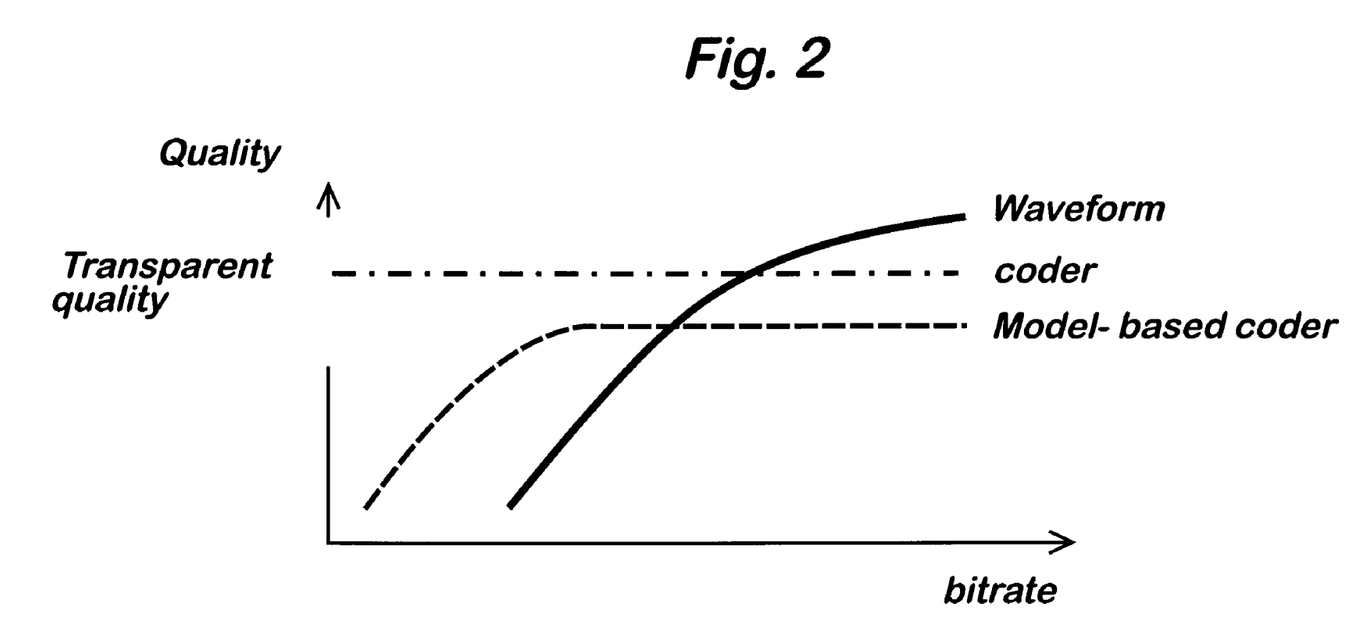
FIG. 2 is a graph showing the relative qualities of different encoding schemes.

Encoding schemes that are particularly robust to channel degradation, such as model based parametric encoders, limit the quality of the encoded signal. Even if the information transmitted in the signal is increased by increasing the bit rate of the encoder, the decoded signal will not reach transparent audio quality. The variation in signal quality with increasing bit rate for a model based encoder, is illustrated in FIG. 2. The signal quality for a waveform encoder which does not use a model based encoding method is also illustrated. As shown in FIG. 2 model based coders are superior to waveform encoders at lower bit rates, but do not converge towards transparent quality as the bit rate is increased.

The inventors of the present invention propose to compensate for the limited quality of robust encoding methods by encoding part of the signal with a high quality encoding method which does not use model based encoding methods.

According to an embodiment of the present invention a high quality non model based encoder and a robust model based encoder are used to encode different portions of a signal in dependence on the conditions of the channel used to transmit the signal. Accordingly during poor channel conditions the signal may be encoded such that the quality of the signal is not substantially affected by degradations in the channel quality. However when the conditions of the channel are good the quality of the signal may be enhanced by encoding part of the signal using a high quality non model based encoder.

The implementation of an embodiment of the present invention will now be described with reference to FIG. 3.

Figure 3:
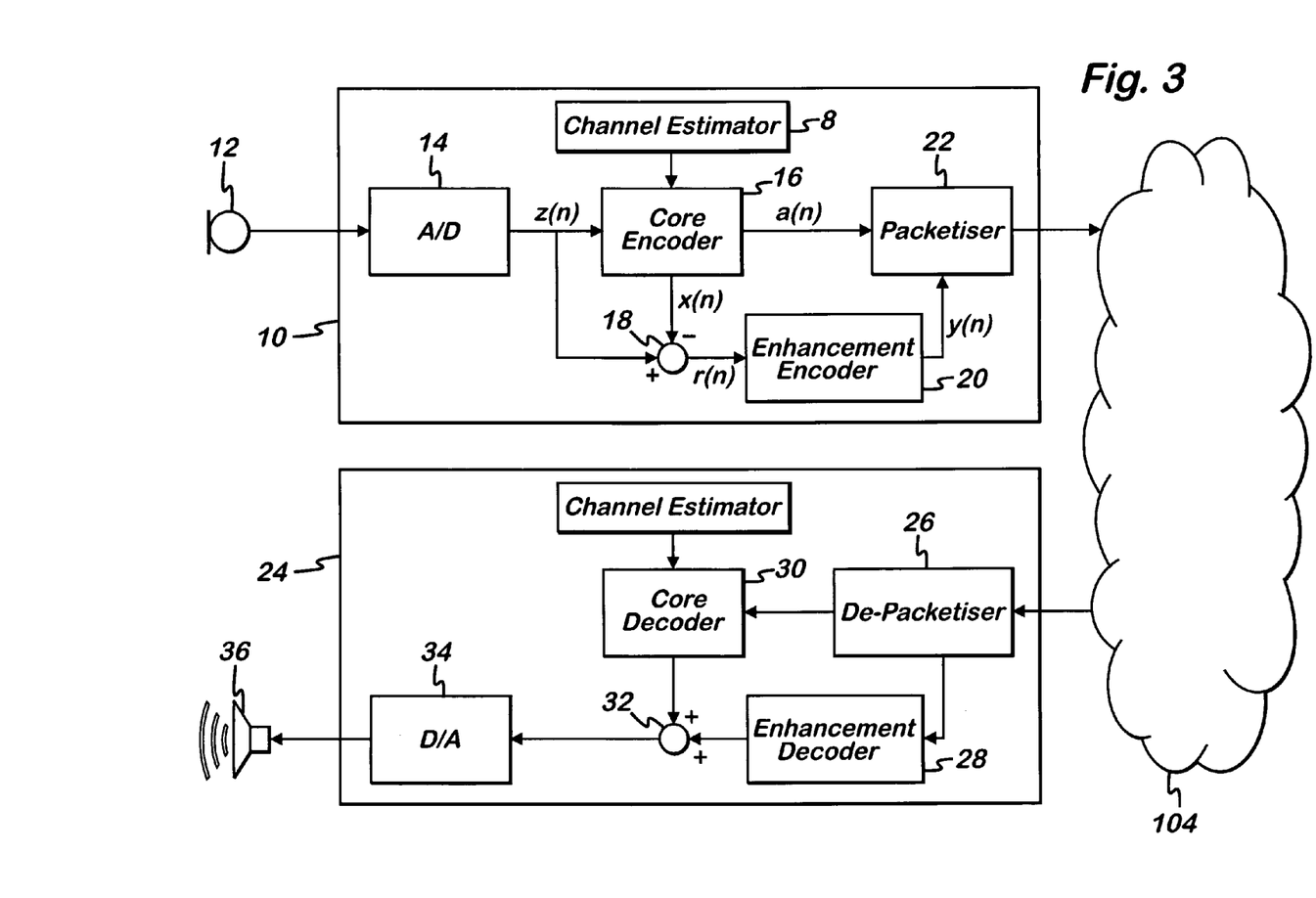
FIG. 3 is diagram of a receiver and a transmitter according to an embodiment of the invention.

FIG. 3 shows a signal transmitter 10 provided in the source terminal 100 and a signal receiver 24 provided in the destination terminal 112. It will be readily appreciated that the transmitter 10 and receiver 24 described may be present in both the source terminal and the destination terminal.

As shown in FIG. 3, the signal transmitter 10 includes an analogue to digital converter 14, a core encoder 16, an enhancement encoder 20, a channel estimation unit 8 and a packetiser 22.

In operation, analogue signals such as speech are input into the analogue to digital converter 14 from a microphone 12. The digital signals output from the analogue to digital converter 14 are input into a core encoder 16.

According to an embodiment of the invention the core encoder uses a model based parametric encoding method. In a preferred embodiment of the invention the model based parametric encoding method provides a waveform approximation of the input.

The proportion of the signal to be encoded by the core encoder is dependent on the conditions of the channel. In one embodiment of the invention the conditions of the channel are estimated by the channel estimation unit 8. The channel estimation unit 8 may be arranged to estimate the available bandwidth of the channel. The channel estimation unit may determine the quality of the signal received at the destination terminal by information provided by the destination terminal 112. The information provided by the terminal 112 on the quality of the received signal may relate to information on packet loss and variations in signal propagation delay, otherwise referred to as jitter.

The enhancement encoder 20 is arranged to encode the portion of the signal not encoded by the core encoder. According to an embodiment of the invention the enhancement encoder 20 is arranged to use a high quality non model based encoding method to encode the part of the signal not encoded by the core encoder.

In a preferred embodiment of the invention the encoding scheme used by the enhancement encoder is a waveform encoding scheme based on the Modified Discrete Cosine Transform (MDCT).

The channel estimation unit is arranged to report at least some of the channel parameters to the core encoder 16. Based on these parameters the core encoder 16 decides what proportion of the signal input from the analogue to digital converter 14 to encode.

In one embodiment of the invention the core encoder 16 applies an algorithm to the channel parameters to determine what proportion of the signal to encode at the core encoder. In an alternative embodiment of the invention predefined ranges are set for a channel parameter, such as bandwidth, to determine which range the parameter falls within. The core encoder is then arranged to encode a proportion of the signal which corresponds to the range to which the parameter belongs.

The signal input into the core encoder may be a frequency domain signal. In this case the portion of the signal encoded by the core and the enhancement encoder may be adjusted by adjusting the frequencies that are encoded by the core encoder and the enhancement encoder.

According to one embodiment of the invention the core encoder may select a cut off frequency $f_c$ above which the core encoder will not encode. By reducing the cut off frequency the portion of information that is contained in the encoded signal encoded by the core encoder is reduced.

The cut off frequency $f_c$ may be determined from channel characteristics such as: the amount of packet loss and amount of jitter as reported by the terminal 112, and from the bandwidth available in the channel. The inventors have found it particularly advantageous to set the cut off frequency high, such that a larger portion of the signal is encoded using the core encoder, when the channel characteristics indicate that the channel is of poor quality.

In one embodiment of the invention, the cut off frequency $f_c$ is adjusted to be proportional to a channel degradation indicator value. The channel degradation indicator is calculated to be proportional to a measure of packet loss and to a measure of jitter, and inversely proportional to the available bandwidth.

In one embodiment of the invention, the cut off frequency $f_c$ is proportional to the degree of packet loss and jitter only.

In one embodiment of the invention, the cut off frequency $f_c$ is proportional to the degree of packet loss only.

In one embodiment of the invention, the cut off frequency $f_c$ is proportional to the degree of jitter only.

In one embodiment of the invention, the cut off frequency $f_c$ is inversely proportional to the available bandwidth only.

After the core encoder 16 has encoded a portion of the signal defined by the cut off frequency the encoder is arranged to output the encoded signal a(n) to the packetiser 22.

The enhancement encoder is arranged to encode the remaining portion of the signal. In a preferred embodiment of the invention the part of the signal not encoded by the core encoder may be determined by subtracting the information encoded by the core encoder from the signal output from the analogue to digital converter z(n) to generate a residual signal r(n). The information encoded by the encoder may be determined by partially or entirely decoding the encoded signal a(n) to generate a signal x(n).

As shown in FIG. 3, the core encoder 16 is arranged to output the signal x(n) indicating the information that has been encoded by the core encoder. The signal x(n) is provided to a mixer 18 where it is subtracted from the signal z(n) output from the analogue to digital converter 14.

In a preferred embodiment of the invention the core encoder 16 will encode the frequencies below the cut off frequency according to the parametric encoding method. The frequencies above the cut off frequency $f_c$ may be encoded by the encoder as a series of zeros. The encoded signal is then either partially or entirely decoded to produce a signal x(n) which is subtracted from the signal z(n).

Encoding the signal at the encoder will remove some of the information from the signal z(n) which is encoded. Thus the decoded signal x(n) will contain less information than the signal z(n). As such when the signal x(n) is subtracted from the signal z(n) at the mixer 18 frequencies that were not encoded by the core encoder will be provided to the enhancement encoder in the residual signal r(n).

More specifically the residual signal r(n) will contain the original values of signal z(n) that are above the cut off frequency $f_c$ and additionally any information that was not encoded by the core encoder below the cut off frequency $f_c$, thereby accounting for the error of the core encoder.

The residual signal r(n) is encoded by the enhancement encoder using a high quality non model based encoding method. The signal y(n) encoded by the enhancement encoder is then output to the packetiser 22.

The packetiser 22 is arranged to input the encoded signals a(n) and y(n) received from the core encoder 16 and the enhancement encoder 20 respectively into the payloads of data packets. In one embodiment of the invention encoded signal frames of the encoded signals a(n) and y(n) may be transmitted in the same payload of a data packet. In an alternative embodiment of the invention the separate data packets may be used to transmit frames of the encoded signals a(n) and y(n) respectively. Header information provided in the header of each data packet may indicate the encoding scheme used for the frames contained in the payload. The data packets may then be transmitted to the destination terminal 112 via the network 104.

Reference will now be made to the signal receiving circuitry 24 provided in the destination terminal 112, which is also shown in FIG. 3. The receiving circuitry comprises a core decoder 30, an enhancement decoder 28, a de-packetiser 26 and a digital to analog converter.

The data packets received by the terminal 112 are input into the de-packetiser 26 which is arranged to extract the encoded frames provided in the payload. Frames that were encoded by the core encoder may be identified by the packetiser using specific information provided in the header of the packet, or from parameters that may be extracted from the encoded frames.

The de-packetiser 26 is arranged to output encoded frames that were encoded by the core encoder to the core decoder 30. Similarly the de-packetiser is arranged to output encoded frames that were encoded by the enhancement encoder 20 to the enhancement decoder 28.

The core decoder is arranged to decode the signal received from the packetiser according to the encoding scheme used at the core encoder. The enhancement decoder is arranged to decode the signal received from the packetiser according to the encoding scheme used at the enhancement encoder.

The decoded signal output from the core decoder 30 is input into a mixer 32. Similarly, the decoded signal output from the enhancement decoder 28 is input to the mixer 32. At the mixer the decoded signals output from the core decoder and the enhancement decoder are combined. The output of the mixer is the reconstructed decoded digital signal.

The decoded digital signal output from the mixer 32 is then input into the digital to analogue converter 34 which converts the digital signal into an analogue signal. The analogue signal is then output to an output device such as a loudspeaker 36.

In an alternative embodiment of the invention the signal z(n) may be transformed into the Linear Prediction (LP) domain by applying Linear Predictive Coding (LPC) to the signal z(n) before it is encoded. This embodiment of the invention will be described with reference to FIG. 4.

LPC is a known method of analyzing speech signals. LPC analyses speech signals to produce a set of LP parameters and a LP residual signal. An LP domain signal is less sensitive to packet loss because it is possible to predict the parameters of a lost LP data packet.

Figure 4:
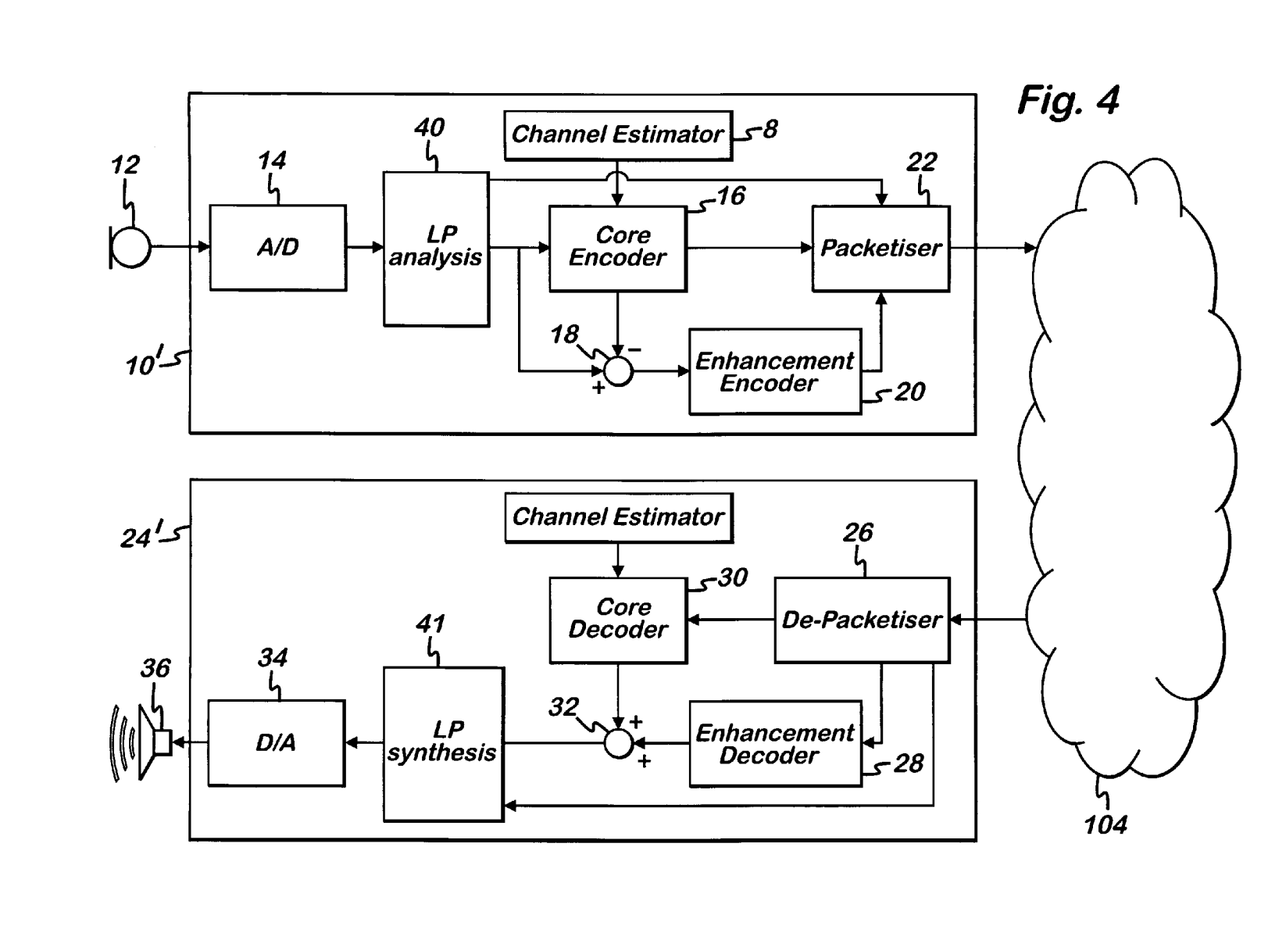
FIG. 4 is a diagram of a receiver and a transmitter according to an alternative embodiment of the invention.

FIG. 4 shows a schematic representation of a section of the transmitting circuitry 10' of the transmitting terminal 100 and a section of the receiving circuitry 24+ of the receiving terminal 112. Components of the receiving and transmitting circuitry that were described in relation to FIG. 3 are referred to using like reference numerals.

As shown in FIG. 4, the signal z(n) output from the analogue to digital converter is input into an LP analysis filtering and coding block 40. The LP analysis filtering and coding block 40 generates a set of LP parameters and an LP residual signal z*(n). The LP parameters are output to the packetiser 22.

The LP residual signal z*(n) is input into the core encoder 16 and to the mixer 18. The core encoder encodes information in the LP residual signal z*(n) according to a model based encoding method that preferably provides a waveform approximation of the LP residual signal. The encoded signal a*(n) is output from the core encoder to the packetiser 22. The core encoder also outputs a signal x*(n) representative of the information in the LP residual signal that was encoded by the core encoder. The proportion of the information in the LP residual signal z*(n) that is encoded by the encoder may be controlled in dependence of the channel parameters as described previously.

The signal x*(n) is subtracted from the LP residual signal z*(n) at the mixer 18. This produces a residual signal r*(n) that is input into the enhancement encoder 20.

The enhancement encoder is arranged to encode the residual signal r*(n) according to a high quality non model based encoding scheme. The enhancement encoder outputs the encoded signal y*(n) to the packetiser 22.

The LP parameters and encoded signals a*(n) and y*(n) are transmitted in data packets via the network to the destination terminal 112. In one embodiment of the invention the LP parameters, and the signal frames of the encoded signals a*(n) and y*(n) may be combined in the payloads of the same packets. In an alternative embodiment of the invention the LP parameters, encoded signal frames of the signal a*(n) and encoded signal frames of the signal y*(n) may be transmitted in separate packets.

At the destination terminal the core decoder 30 is arranged to decode the encoded signal a*(n) according to the encoding scheme used in the core encoder 16. Similarly the enhancement decoder 28 is arranged to decode the encoded signal y*(n) according to the encoding scheme used in the enhancement encoder 20.

The decoded signals output from the core decoder and the enhancement decoder are combined to produce the LP residual signal. The LP residual signal and the LP parameters are input to an LP synthesis block 41 which is arranged to generate the digital signal z(n).

In an alternative embodiment of the invention the core encoder 16 only uses a waveform approximating encoding system when the signal includes voiced sounds. Voiced sounds may be detected using a sound classification method known in the art. When the sound is not classified as voiced the encoder may model the output as random white noise in combination with a spectral envelope.

In one embodiment of the invention the enhancement encoder may be switched off, thereby not producing an enhanced encoded signal y(n). The enhancement encoder may be switched off if it is determined that too much of the enhanced encoded signal, for example more than a threshold amount, was not received by the encoder. The enhancement encoder may be switched on again when channel conditions improve as detected by the channel estimation block 8.

In one embodiment of the invention the proportion of the signal that is encoded by the core encoder 16 may be adjusted by adjusting the number of bits available to the core encoder in relation to the number of bits available to the enhancement encoder. For a fixed bit rate, reducing the number of bits available to the core encoder will increase the number of bits available to the enhancement encoder, thus increasing the proportion of the signal encoded by the enhancement encoder.

In one embodiment of the invention the energy of the signal a(n) output from the core encoder is scaled in order to compensate for the enhancement encoder being switched on and off. The energy of the signal a(n) is multiplied by a scaling factor when the enhancement layer is off in order to maintain a correct signal energy.

In an embodiment of the invention the core encoder 16 uses an encoding scheme that does not employ inter-frame encoding methods. One example of interframe encoding is a method of encoding that determines the difference between two frames and transmits only the information of the difference between the frames. By using an encoding scheme that does not employ interframe encoding methods, a packet may be lost without significantly affecting the perceived quality of the received signal.

In an embodiment of the invention described above the signal r(t) input into the enhancement encoder includes the portion of signal not encoded by the core encoder due to the encoding error of the core encoder, and the portion of the signal falling outside the frequency range encoded by the core encoder. In an alternative embodiment of the invention the enhancement encoder may be arranged to encode only portions of the signal falling outside the frequency range encoded by the encoder. This may be achieved by explicitly dividing the frequency ranges of the signals input into the core encoder and the enhancement encoder. Alternatively the residual signal may be filtered to remove the frequencies encoded by the core encoder.

In one embodiment of the invention a set of cut off frequencies are used to define the portion of the signal encoded by the core encoder and the portion of the signal encoded by the enhancement encoder. For example two cut off frequencies may be used to define a range of frequencies to be encoded by the encoder. This range may be varied in accordance with the quality of the channel. If the channel quality is poor a smaller range of frequencies may be encoded by the enhancement encoder.

Alternatively more than one range may be defined by a plurality of cut off frequencies. These ranges may define frequency bands that are more important to transmit reliably than others. For example harmonic frequencies may be considered to be more important than other frequencies. According to this embodiment of the invention the characteristics of the signal may be analyzed to determined the harmonic frequencies in the signal. The cut off frequencies may then be set such that more harmonic frequencies are encoded by the core encoder when the channel degradation value is high. The enhancement encoder will then encode the remaining frequencies.

According to an alternative embodiment of the invention, when more than one frequency range is defined more than one enhancement encoder, or core encoder may be used to encode different ranges of frequencies.

In one alternative embodiment of the invention, an adjustable filter may be used to generate the residual signal instead of the mixer 18. According to this embodiment of the invention the core encoder is not arranged to output the signal x(n), instead the adjustable filter may be arranged to remove frequencies from the signal that are encoded by the core encoder to produce the residual signal. In the case where the core encoder encodes frequencies below a cut off frequency $f_c$, the adjustable filter may remove the frequencies below $f_c$ from the signal z(n) to produce the signal r(n) to be applied to the enhancement encoder.

While this invention has been particularly shown and described with reference to preferred embodiments, it will be understood to those skilled in the art that various changes in form and detail may be made without departing from the scope of the invention as defined by the claims.

What is claimed is:

1. A method of encoding a signal to be transmitted from a terminal via a channel in a communication network comprising:
   receiving the signal at the terminal;
   determining characteristics of the channel to determine a first frequency portion of the signal;
   determining the first frequency portion of the signal based on the determined characteristics of the channel;
   encoding the first frequency portion of the signal in accordance with a first encoding method to produce a first encoded signal portion;
   selectively encoding a second frequency portion of the signal in accordance with a second encoding method to produce a second encoded signal portion, the second frequency portion of the signal comprising a portion of the signal that is not encoded with the first encoding method and is defined by at least one cut off frequency, and the cut off frequency configured to be adjusted to be inversely proportional to available bandwidth of the channel; and
   transmitting the first encoded signal portion and the second encoded signal portion via the channel.

2. The method as claimed in claim 1 further comprising determining the second frequency portion of the signal based on the first frequency portion of the signal.

3. The method as claimed in claim 1 wherein the second frequency portion of the signal is not encoded with the first encoding method.

4. The method as claimed in claim 1 wherein the first encoding method is a model based encoding method.

5. The method as claimed in claim 1 wherein the second encoding method is a non model based encoding method.

6. The method as claimed in claim 1 wherein the characteristics of the channel relate to at least one of channel capacity, channel bandwidth, channel jitter and channel packet loss.

7. The method as claimed in claim 1 wherein the cut off frequency is adjustable.

8. The method as claimed in claim 7 wherein the cut off frequency is further configured to be adjusted to be proportional to at least one of a measure of packet loss and a measure of jitter.

9. The method as claimed in claim 7 wherein the cut of frequency is further configured to be adjusted to be proportional to a channel degradation indicator value.

10. The method as claimed in claim 9 wherein the channel degradation indicator value is determined from at least one of a measure of packet loss, a measure of jitter or a measure of bandwidth of the channel.

11. The method as claimed in claim 1 wherein a plurality of cut off frequencies defines at least one range to be encoded by the first encoding method.

12. The method as claimed in claim 11 wherein the at least one range is configured to be adjusted based on characteristics of the channel.

13. The method as claimed in claimed in claim 11 wherein the at least one range corresponds to a harmonic frequency.

14. The method as claimed in claim 1 further comprising:
decoding the first encoded signal portion to produce a first decoded signal portion; and
subtracting the first decoded signal portion from the received signal to determine the second frequency portion of the signal.

15. The method as claimed in claim 1 wherein the received signal is a Linear Prediction residual signal.

16. The method as claimed in claim 1 wherein the second frequency portion of the signal is not encoded.

17. The method as claimed in claim 1 further comprising detecting periods of unvoiced sound in the received signal.

18. The method as claimed in claim 17 wherein the periods of unvoiced sound are modelled by white random noise in combination with a spectral envelope by the first encoding method.

19. The method as claimed in claim 1 wherein the first encoding method provides a waveform approximation of the received signal.

20. The method as claimed in claim 1 wherein the first encoding method is a non interframe encoding method.

21. The method as claimed in claim 1 wherein the second encoding method is a high quality encoding method.

22. The method as claimed in claim 1 wherein the second encoding method is a waveform encoding method.

23. The method as claimed in claim 1 wherein the signal is an audio signal.

24. A device for encoding a signal to be transmitted from a terminal via a channel in a communication network comprising:
means for receiving the signal at the terminal;
means for determining characteristics of the channel to determine a first frequency portion of the signal;
means for determining the first frequency portion of the signal based on the determined characteristics of the channel;
means for encoding the first frequency portion of the signal in accordance with a first encoding method to produce a first encoded signal portion;
means for selectively encoding a second frequency portion of the signal in accordance with a second encoding method to produce a second encoded signal portion, the second frequency portion of the signal comprising a portion of the signal that is not encoded with the first encoding method and is defined by at least one cut off frequency, and the cut off frequency configured to be adjusted to be inversely proportional to available bandwidth of the channel; and
means for transmitting the first encoded signal portion and the second encoded signal portion via the channel.

25. A device configured to encode a signal to be transmitted from a terminal via a channel in a communication network comprising:
a receiver configured to receive the signal at the terminal;
a channel determiner configured to determine characteristics of the channel to determine a first frequency portion of the signal;
a portion determiner configured to determine the first frequency portion of the signal based on the determined characteristics of the channel;
a first encoder configured to encode the first frequency portion of the signal in accordance with a first encoding method to produce a first encoded signal portion;
a second encoder configured to selectively encode a second frequency portion of the signal in accordance with a second encoding method to produce a second encoded signal portion, the second frequency portion of the signal comprising a portion of the signal that is not encoded with the first encoding method and is defined by at least one cut off frequency, and the cut off frequency configured to be adjusted to be inversely proportional to available bandwidth of the channel; and
a transmitter configured to transmit the first encoded signal portion and the second encoded signal portion via the channel.

* * * * *

UNITED STATES PATENT AND TRADEMARK OFFICE
CERTIFICATE OF CORRECTION

PATENT NO. : 8,279,968 B2  
APPLICATION NO. : 12/006094  
DATED : October 2, 2012  
INVENTOR(S) : Lindblom et al.

Page 1 of 1

It is certified that error appears in the above-identified patent and that said Letters Patent is hereby corrected as shown below:

In the Claims

In Column 9, Line 23, In Claim 13, after "claimed in" delete "claimed in".

Signed and Sealed this
Twenty-fourth Day of February, 2015

Michelle K. Lee
*Deputy Director of the United States Patent and Trademark Office*